United States Patent [19]

Hoguchi et al.

[11] Patent Number: 4,672,729
[45] Date of Patent: Jun. 16, 1987

[54] METHOD FOR MACHINING CLUTCH GEAR FOR AUTOMOBILE TRANSMISSION

[75] Inventors: Tetsuya Hoguchi; Shigeru Morita, both of Toyota, Japan

[73] Assignee: O-Oka Forge Co. Ltd, Aichi, Japan

[21] Appl. No.: 659,910

[22] Filed: Oct. 11, 1984

[30] Foreign Application Priority Data

Oct. 20, 1983 [JP] Japan .................................. 58-196638

[51] Int. Cl.⁴ .............................................. B23P 15/14
[52] U.S. Cl. ...................................... 29/159.2; 72/332
[58] Field of Search ......................... 29/159.2, 159 R; 72/332, 333, 341; 74/192

[56] References Cited

U.S. PATENT DOCUMENTS

| | | | |
|---|---|---|---|
| 2,079,513 | 5/1937 | Lapsley | 29/159.2 |
| 3,688,549 | 9/1972 | Ohnishi et al. | 72/334 |
| 4,469,376 | 9/1984 | Pelz | 29/159.2 |

FOREIGN PATENT DOCUMENTS

| | | | |
|---|---|---|---|
| 2926255 | 1/1981 | Fed. Rep. of Germany | 29/159.2 |
| 622160 | 2/1927 | France | 29/159.2 |
| 386510 | 1/1933 | United Kingdom | 29/159.2 |
| 618172 | 8/1978 | U.S.S.R. | 29/159.2 |

Primary Examiner—Percy W. Echols
Attorney, Agent, or Firm—Fred Philpitt

[57] ABSTRACT

A method for machining a clutch gear for the transmission of an automobile which comprises forming a generally round annular bar made of malleable material in a cold forging or hot forging, urging the generally round annular bar against a die to form a final predetermined dimensional cross section and a chamfer projection simultaneously, fine blanking the chamfer projection into a tooth form and pushing the tooth form into a die from an end surface opposite the chamfer projection to form an inverted taper on the tooth form which prevents disengagement of the clutch.

1 Claim, 13 Drawing Figures (A)
PRIOR ART (B)
PRIOR ART (a)

(b)

(c)

(d)

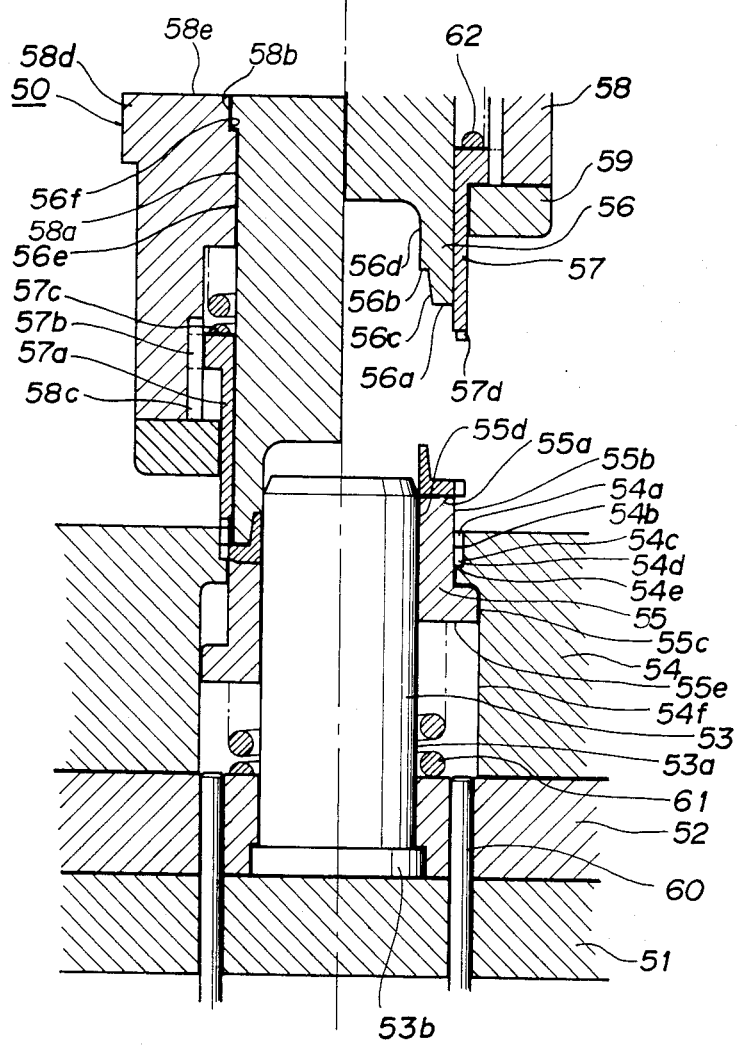
FIG. 5
(a)
FIG. 5
(b)   (c)
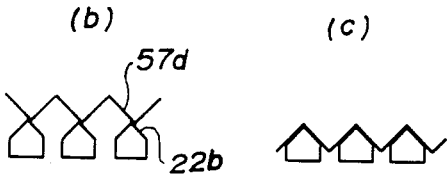

METHOD FOR MACHINING CLUTCH GEAR FOR AUTOMOBILE TRANSMISSION

BACKGROUND OF THE INVENTION

This invention relates to a method for machining a clutch gear for the transmission of an automobile, and particularly, relates to a method for machining a clutch gear for the transmission of an automobile comprising a first step of providing a rough shape of a generally round annular bar made of a malleable material. The round bar may be made in a cold forging or a hot forging. The process also includes a second step of urging the generally round bar against a die and simultaneously forming a final predetermined dimensional cross section and a chamfer projection, a third step of blanking the chamfer projection into a tooth form by a fine blanking process, and a fourth step of pushing said form into a die from an end surface opposite the chamfer projection and forming an inverted taper on the tooth form which prevents disengagement of the clutch.

Heretofore, as a machining process for clutch gears, prior art such as the invention of Japanese patent publication No. 47-14696 existed for cold plastic machining. The invention disclosed in the Japanese official gazette comprises a first step of forming an annular portion of an almost rectangular cross section and of at least a predetermined dimension on an annular member or a disc member made of a malleable material, a second step of abutting a die having a plurality of radial grooves of a triangular cross section against an end surface in the axial direction of the annular portion to form a chamfer projection, a third process of abutting the die having a plurality of teeth on the end surface of the annular portion to be worked so that the teeth end portions thereof are positioned between the adjacent chamfer projections and applying pressure in the axial direction to form continuous teeth on the chamfer projection and a push wall on the ends of these grooves, a fourth step of blanking and removing the push wall portion which is not continuous with the teeth, and a fifth step of pushing the annular portion into a die having teeth consisting of a tapered side wall and a tapered bottom from the end surface opposite the chamfer projection and forming an inverted taper on the teeth of the annular portion to prevent disengagement of the clutch. However, the technique of the invention of the prior application has the following problems. Namely, in the first place, many machinings are required, and in the second place, when the push wall is blanked in the tooth portion, there is a problem in the blanking precision of the tooth top and the bottom land. Also, there is a need to machine the tooth top and the end surface of the tooth opposite the chamfer since burrs are produced on the end surface of the tooth and the side opposite the chamfer side. In the third place, referring to FIG. 1, FIG. 1 is a drawing showing the relationship of the gear clutch (1) and the sleeve (2) in a synchro-mechanism, and FIG. 1A is the structure in which the peripheral surface is machined by leaving the tooth top opposite the chamfer (1a) of the tooth form portion to produce a stop member (1b) for prevention of overshift in the direction of arrow mark of the sleeve, and in the conventional machining process, this structure is known. FIG. 1B is the structure in which a stop member (1d) for overshift is provided at the tooth top of the spline in the sleeve so that overshift is prevented upon abutment with the end surface of the chamfer side (1e) of the gear clutch (1). Accordingly, in case of the example of FIG. 1B, high precision is required over an entire width of the tooth portion since the tooth top and the bottom land of the gear clutch (1) fit completely with the sleeve (2). Also, a surface (1f) continuous with the chamber ridge which acts as a stopper at the gear clutch side is needed, and the role of the stopper is not served if the concave portion (1c) exists at the chamfer side of the bottom land of the gear clutch shown in FIG. 1A. Accordingly, in the gear clutch to be used in the example of FIG. 1B, there is a drawback that cannot be dealt with by the conventional processing method.

As described in the foregoing, in the conventional machining process or in the technique of the invention disclosed in the Japanese patent publication No. 47-14696, there are many problems and drawbacks.

SUMMARY OF THE INVENTION

An object of this invention is to provide a novel machining process for forming a clutch gear for a transmission by providing a workpiece having a rough shape through the cold forging or hot forging of a generally round annular bar made of malleable material such as carbon steel or alloy steel, whereby a machining process for final finishing the cross section which is required in the conventional machining process is made unnecessary and the productivity and economy of the process are simultaneously improved.

Another object of this invention is to provide a novel machining process for forming a clutch gear for a transmission by including a fine blanking process which provides a tooth form that satisfies the necessary precision of the product whereby formation of a tooth form required in the conventional machining process and formation of a push wall are no longer required.

Another object of this invention is to provide a novel machining process for forming a clutch gear for a transmission by chamfering a surface of the tooth portion of the end surface opposite the chamfer projection which allows a reduction of minor burrs caused by the fine blanking whereby generation of raised burrs during the blanking of the push wall in the conventional machining process is eliminated and as a result, further machining is not required.

BRIEF DESCRIPTION OF THE DRAWINGS

FIGS. 5(a)-(c) are a view showing a a left half portion in the cross sectional view of the inverted taper forming device employed in the machining process of this invention at a time of descending of a ram and a right half portion thereof at a time of ascending of a ram, and views showing a condition of positioning of a workpiece (W) and a die tooth form.

DETAILED DESCRIPTION OF THE INVENTION

Figure 1:
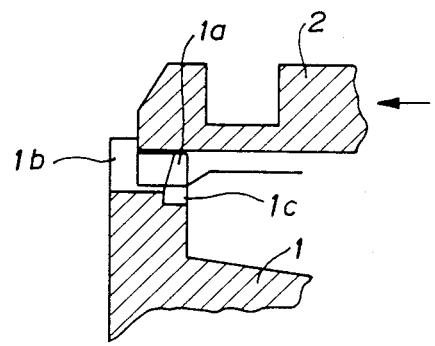
FIGS. 1A and 1B are explanatory drawings showing a relationship of a gear clutch and a sleeve in a synchro-mechanism in the prior art machining process that has been employed heretofore.
Figure 1:
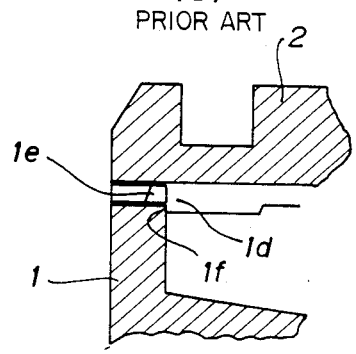
Figure 2:
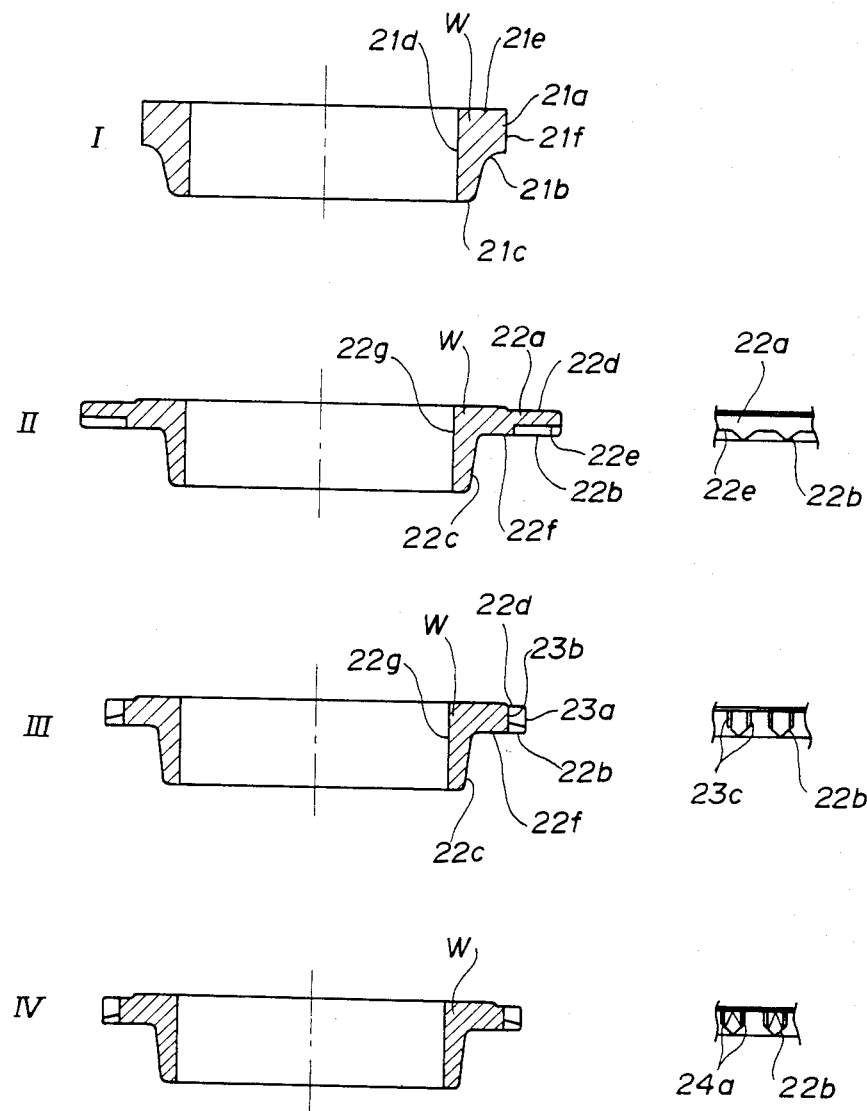
FIG. 2 is a process drawing showing an example of the steps included in a machining process of this invention.

In FIG. 2, the order of a cold plastic machining process of an annular product or a disc product having spline teeth according to this invention is shown. In step I, a workpiece (W) composed of end surfaces (21c) and (21e) in an axial direction, an outwardly extending flange portion (21a) as shown in the drawing, a fitting hole (21d), a peripheral surface (21f) of cylindrical shape and a peripheral surface (21b) of conical shape, is formed by cold forging or hot forging a malleable material such as carbon steel, alloy steel or the like. In this case, the workpiece (W) is a generally rough shape with respect to fluidity or the like as compared with a final predetermined dimensional form. This form is suitable for mass production and can be formed economically.

The workpiece (W) as mentioned above is formed into a form shown in FIG. 3 in step II. A tooth portion (22a), chamfer projection (22b), and conically tapered surface (22c) are simultaneously formed on the peripheral surface (21f) of the cylindrical form as shown in FIG. 2, step II from the conical peripheral surface (21b) by a chamfer forming device (30).

Figure 3:
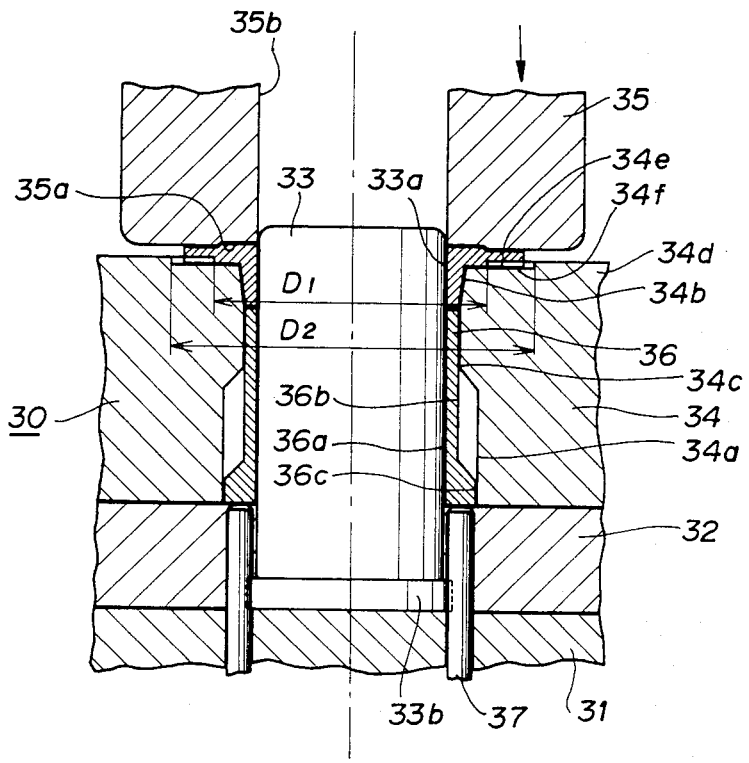
FIGS. 3(a)-(c) are a vertical cross sectional view of a chamfer forming device employed in the machining process of this invention, a partial plan of a die and its partial vertical cross sectional view, respectively.
Figure 3:
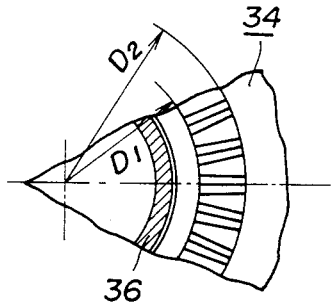
Figure 3:
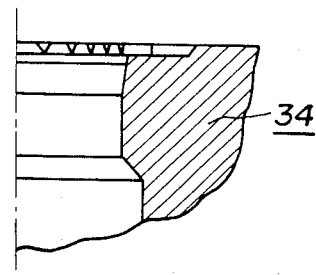

This chamfer forming device (30) is shown in FIG. 3 and is composed of a receiving base (31), a core metal holder (32), a core metal (33), a die (34), a punch (35), a knockout sleeve (36) and a plurality of knockout pins (37). The punch (35) and the knockout pins (37) are caused to move vertically in a predetermined order by a press ram and an ejector pin not shown in the drawing. The receiving base (31) is formed with holes corresponding to a plurality of the knockout pins (37), and the core metal holder (32) is formed with holes corresponding to the knockout pins (37), and additional inner holes to which a small diametral portion (33a) of the core metal (33) and a large diametral portion (33b) are fitted, and as a result, the core metal (33) is secured stationarily. The core metal (33) is formed with base portions (33a) and (33b); portion (33a) corresponds to the inner hole of the workpiece (W), and the workpiece (W) is fitted concentrically around the core metal (33). The die (34) is formed with an inner hole (34a) corresponding to the large diametral portion of the knockout sleeve (36), of a predetermined dimension, and a straight inner hole (34c) continuous with inner hole (34b) and (34a). The die 34 further includes a flat end surface (34d); a groove (34e) of a triangular cross section engraved radially in the range of (D1)–(D2) at its flat end, and a bottom line (34f) of the groove (34e) at a right angle with the axis and continuous with the conical inner hole (34b). Also, the punch (35) is formed with a press surface (35a) at a right angle with the axis and with an inner hole (35b) of a diameter corresponding to the outer diametral surface (33a) of the core metal (33). The knockout sleeve (36) is formed with an inner hole (36a) corresponding to the outer diametral portion (33a) of the core metal (33), and outer diametral portions (36c) and (36b) which correspond to the inner holes (34a) and (34c) of different diameters of the die (34).

Accordingly, in step II, when the workpiece (W) from step I is fitted to the core metal (33), as shown in FIG. 3, and the punch (35) is pressed down in the direction of the arrow mark by a press ram not shown in the drawing, the end surface (21e) of the workpiece (W) is pressed by the press surface (35a) of the punch (35). The tapered surface (21b) on the other side is shifted with its thickness along the surface (34b) in the axial direction with the surface (34f) at a right angular direction with the axis of the die (34). Furthermore, as the pushing down of the punch (35) is in progress, expansion is effected in a predetermined dimension whereby the groove (34e) with the bottom line (34f) of a triangular cross section at a right angular direction with the axis is filled. Similarly, the material proceeds between and fills the conical inner hole 34b formed with the core metal 33a in the axial direction, and the material abuts on the upper end surface of the knockout sleeve (36) whereby the formation is completed. Thus, the chamfer portion (22b) terminated with the inner diameter (D1) is formed on the upper portion of the conically tapered portion by the upper end surface (34d) of the die (34) and the triangular groove (34e). Also, a predetermined dimension conically tapered surface (22c) is formed at the lower portion of the conically tapered portion (21b) of the workpiece (W) in correspondence to the conical inner hole (34b) of the die (34) and the outer diameter (33a) of the core metal (33). As a result, after the workpiece (W) of step I of FIG. 2 is formed according to step II of FIG. 2, the punch (35) is lifted, and then, the knockout pins (37) are pushed up by the ejector pin, and furthermore, the knockout sleeve (36) is pushed up. Accordingly, the workpiece (W) formed in the predetermined form of step II with the chamfer is pushed out from the core metal (33) and the die (34), and is mounted on a spline blanking device of the next step III.

Figure 4:
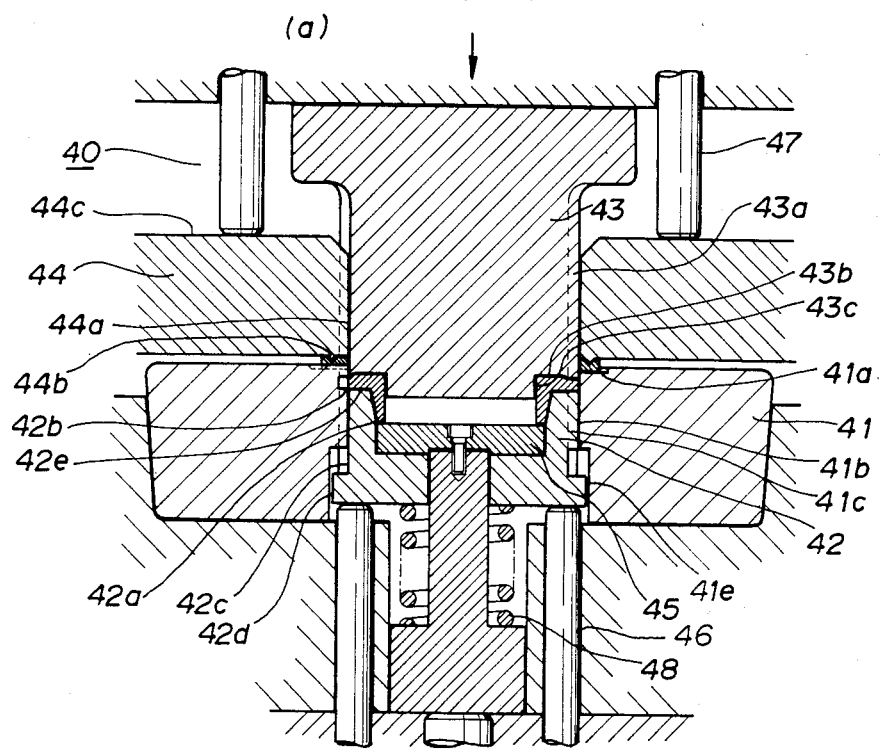
FIGS. 4(a)-(d) are a spline blanking device employed in the machining process of this invention, a partial plan view of a die, a partial vertical cross sectional view of a plate holder and a partial vertical cross sectional view of a die, respectively.
Figure 4:
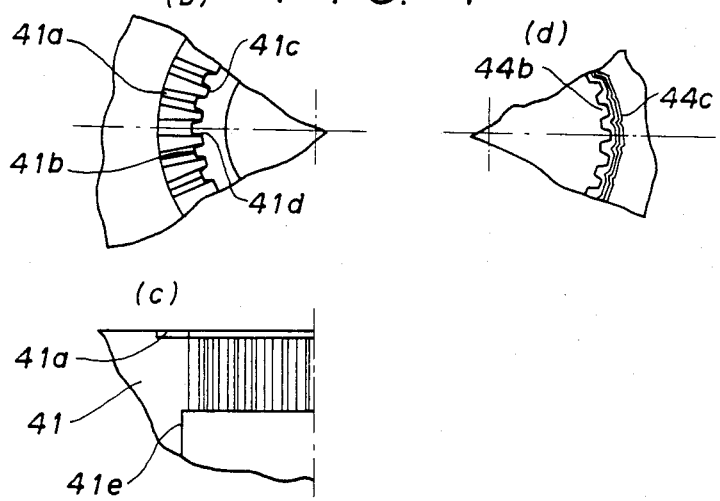

The workpiece (W) formed in the predetermined form in step II with the chamfer is blanked in a spline tooth form to include a surface (23c) mutually in parallel to the large diameter (23a) and small diameter (23b) by the spline blanking device (40) shown in FIG. 4.

This blanking device (40) employs a fine blanking method so as to be able to obtain a tooth form of high precision, particularly tooth form precision and tooth surface precision, and is composed of a die (41), counter holder (42), punch (43), plate holder (44), knockout pin (45), a plurality of pressure pins (46) and (47), and a spring (48). The punch (43) and the knockout pin (45) are caused to move vertically in a predetermined direction by a press ram and an ejector not shown in the drawing. Also, the pressure pins (46) and (47) apply pressure to the counter holder (42) and the plate holder (44) by a high pressure generating device such as an oil hydraulic system or urethane rubber not shown in the drawing.

The die (41) is composed of a groove (41a) of triangular cross section engraved radially which corresponds to the cross section of chamfer projection (22b) formed in step II, spline large diameter portion (41b), small diameter portion (41c), mutually parallel teeth surfaces (41d) and inner hole (41e) corresponding to the large diametral portion of the counter holder (42). The counter holder (42) is formed with a tapered portion (42a) corresponding to the conically tapered portion (22c) of the workpiece (W) in step II, a plurality of triangular cross sectional grooves (42b) of radial form which correspond to the chamfer projection (22b), a spline tooth form portion (42c) that slides in the vertical direction when fitted to the spline tooth form portions (41b), (41c) and (41d) of the die (41) and a large diametral portion (42d) that serves as a stopper in the vertical direction together with the inner hole (41e). Upon the ascending of the press ram, the groove of the triangular cross section of the counter holder (42) is positioned at a height equal to that of the groove (41a) of triangular cross section of the die (41) by a pressure pin (46). The punch (43) is composed of a spline tooth form (43a) to be fitted with almost zero clearance in the spline tooth form portions (41b), (41c), and (41d) of the die (41), the surface (43b) corresponding to the upper end surface of the workpiece (W), and the portion (43c) corresponding to the inner hole (22g). The plate holder (44) is formed with an inner spline tooth form portion (44a) capable of sliding in the vertical direction in correspondence to the spline tooth form portion (43a) of the punch (43), and a V-shaped annular projection (44b) along the tooth form portion (44a) and a pressure receiving surface (44c) adjacent pressure pins (47). Accordingly, from step II, tapered portion (22c) of the workpiece (W) is fitted to the tapered inner hole (42a) of the counter holder (42) and furthermore, the triangular cross section (22b) of the chamfer portion is positioned to coincide with the portion (41a) of the die (41) and the triangular cross sectional groove portion of the portion (42b) of the counter holder (42) to effect the positioning. The plate holder (44) is pushed down in a direction of the arrow mark by means of the punch (43) and the pressure pin (47) through the press ram not shown in the drawing, whereby the upper end surface (22d) of the workpiece (W) in the process II of FIG. 2 is pressed by the V-shaped annular projection (44b) of the plate holder (44) and the V-shaped projection (44b) is engaged with the portion (22d) of the workpiece (W), so that the surface (22d) is sandwiched by the press surface (43b) of the punch (43) and is also sandwiched by the surface (42e) corresponding to the portion (22f) of the counter holder (42) supported by the pressure pin (46) to press down the workpiece (W). The blanking is carried out to obtain the predetermined spline tooth form which is formed by the portions (41b), (41c) and (41d) of the die (41). As described in the foregoing, after the spline tooth form in step III of FIG. 2 is formed, the punch (43) rises and also, the counter holder (42) is pushed up by the spring (48). When it is pushed up to a predetermined position, the knockout pin (45) is pushed up by the ejector pin, whereby the workpiece (W) can be taken out from the counter holder 42.

As described in the foregoing, the form in step III of FIG. 2 can be obtained, but in this process, particularly as shown in FIG. 4, in addition to the restraining power of the plate holder (44) and the counter holder (42) which is provided by the V-shaped annular projection (44b), the blanking clearance is set at a value slightly smaller such as 0.1% to 0.2% of a plate thickness, which improves the compression stress in the periphery of the shearing region whereby a sheared surface can be obtained in the spline tooth form portion without breaking. Accordingly, the required spline tooth form precision can be obtained by this process, and it is possible to use this process to form products not requiring an inverted taper.

The blanking of the spline tooth form in step III can be used with sufficient satisfaction of the tooth form precision when there is no demand for a counter taper for preventing pull out at the time of meshing. When the inverted taper is required, an inverted taper forming device (50) of FIG. 5 is used.

This device (50) is composed of a receiving base (51), a core metal holder (52), core metal (53), a die (54) having a tapered tooth surface, a cylindrical knockout sleeve (55), punch (56), punch positioning sleeve (57), punch case (58), punch sleeve stopper (59), a plurality of knockout pins (60), and compression coil springs (61) and (62) having different spring constants. The punch (56) and the punch case (58) are caused to move vertically by the press ram not shown in the drawing, and the knockout pin (60) is caused to move vertically in a predetermined direction by the ejector pin. The receiving base (51) is formed with holes corresponding to a plurality of knockout pins (60), and the core metal holder (52) is formed with a plurality of holes identical with those of the corresponding receiving base (51) and additional inner holes to be fitted to a small diametral portion (53a) and a large diametral portion (53b) of the core metal (53) whereby the core metal (53) is stationarily secured. The core metal (53) is formed with a base portion (53a) and a portion (53b), portion (53a) being in correspondence to the inner hole (22g); of the workpiece (W) from step III of FIG. 2, and the workpiece (W) is concentrically fitted around the core metal (53). The die (54) is formed with a tapered spline tooth portion (54a) at equal arrangement in its inner hole, and the tooth portion is composed of a tooth bottom surface (54b) having a straight surface, tooth top surface (54c) and tooth side surface (54d) having a tapered surface, and is formed with an inner hole (54f) in correspondence to a large diametral portion (55c) of a knockout sleeve (55). The knockout sleeve (55) is composed of a portion (55a) corresponding to the portion (22a) of the workpiece, a portion (55b) corresponding to a tooth bottom surface (54b) of the die (54), a portion (55c) corresponding to an inner hole (54f), a portion (55d) corresponding to a small diametral portion (53a) of a core metal (53), and a surface (55e) supported by a spring (61), and is caused to move vertically in the axial direction upon being guided by the spline (54a) of the die (54), the inner hole (54f) and the small diametral portion (53a) of the core metal (53). At the time of ascending of the ram, the sleeve (55) is retained by the spring (61), and the portion (55a) is positioned in a floating state with respect to the upper end surface of the die.

The punch (56) is formed with press surfaces (56a) and (56b) at a right angle to the axial direction, an inner conical hole (56c), a portion (56d) corresponding to the small diametral portion (53a) of the core metal, and a small diametral portion (56e) and a base portion (56f).

The punch positioning sleeve (57) is formed with an inner hole (57a) corresponding to a punch small diametral portion (56e), a groove (57b) for stopping a turn in the rotating direction, a spring receiving surface (57c), and triangular grooves (57d) whose number is equal to that of the chamfer portions (22b) of the workpiece (W), and is previously positioned to coincide with the spline tooth form portion (54a) of the die (54). Accordingly, the spline tooth form of the workpiece (W) fitted to the core metal (53) is automatically positioned at the tooth form portion (54a) of the die.

The punch case (58) is formed with inner holes (58a) and (58b) corresponding to portions (56e) and (56f) of the punch (56), a convex groove (58c) corresponding to a groove (57b) of the punch positioning sleeve (57), and portions (58d) and (58e) forming a chamfer surface. A punch sleeve stopper (59) is used as a stopper for prevention of fall off of the punch sleeve. Furthermore, compression coil springs (61) and (62) have different values of spring constants, and are utilized for positioning the spline tooth of the workpiece (W).

Accordingly, the workpiece (W) having undergone the blanking of the spline tooth form in step III is fitted freely around the core metal (53a) as shown in the right half portion cross section of FIG. 5 and is positioned on the upper end surface (55a) of the knockout sleeve (55) floating on the spring (61). The punch (56) and the punch case (58) are pressed down in the axial direction by the press ram not shown in the drawing, whereby the triangular groove portion (57d) of the punch positioning sleeve (57) previously positioned to coincide with the spline tooth form of the die abuts on the chamfer portion (22b) of the workpiece (W) as shown in FIG. 5(a).

In this case, since the spring constant of the spring (61) that causes the knockout sleeve (55) to float is larger than that of the spring (62) at the punch side, a complete meshing positioning is carried out prior to the abutment of the press surfaces (56a) and (56b) of the punch (56) on the workpiece (W). In the condition where the triangular groove portion (57d) of the positioning punch sleeve (57) and the chamfer portion (22b) of the workpiece (W) become as shown in FIG. 5(a) and FIG. 5(b), the spring (62) has a smaller spring constant. Furthermore, when additional pressure is applied, the press surfaces (56a) and (56b) of the punch (56) abut on the workpiece (W), and the tooth form portion of the workpiece (W) is caused to be pushed into the tooth form portion of the die (54) while compressing the spring (61). As described in the foregoing, during this step, the mutually parallel straight tooth surfaces (23c) which are blanked in step III of FIG. 2 are formed with the tapered tooth surface (24a) as shown in step IV by the tooth bottom surface (54b) of the tapered tooth (54a) of the die, and the tooth top surface (54c) and the tooth side surface (54e) of the tapered surface. Accordingly, when the formation of the inverted tapered surface is completed, the ram ascends, and consequentially, the punch (56) and the positioning punch sleeve (57) rise, and the lower end surface (55e) of the knockout sleeve (55) is pushed up by a plurality of the knockout pins (60) and the spring (61), and the workpiece (W) formed according to step IV of FIG. 2 is removed from the die (54) and the core metal (53).

The machining process of this invention has been described in the foregoing, and now the differences of this invention with the conventional processes are described hereinafter. In step I, while the conventional process employs the form of an almost rectangular cross section of a predetermined dimension, the process of this invention employs a rough surface produced by simplifying the final finished cross section whereby the process of this invention provides mass productivity economically. In step II, while the conventional process provides the formation of only the chamfer projection, the process of this invention provides the formation of the predetermined dimension simultaneously with the formation of the chamfer projection. Next, step III of the conventional process provides the formation of the tooth form together with the formation of the push wall, and in step IV, while the conventional process employs the blanking of the push wall other than the tooth form portion, the process of this invention does not require the formation of the tooth form of step III together with the formation of the push wall and forms the tooth form itself by the fine blanking process. Only with this process can the product precision be sufficiently satisfied.

Next, in step V of the conventional process, the end surface opposite the chamfer is required to be machined due to raised burrs produced at the push wall blanking time. However, in the process of this invention, the inverted taper form is used as the bottom form, and when a chamfering of the surface of about 0.3% is effected on the tooth form portion of the end surface opposite the chamfer projection, the minor burrs due to the fine blanking can be minimized machining is not required and the cold forged surface can be used. Moreover, with respect to the inverted taper forming device (50), the positioning can be made automatically and the workability is improved since the automation of the work is possible.

This invention makes it possible to decrease the number of machining steps when compared with the conventional process as described in the foregoing, and the machining of the tooth form portion is not necessary as the cold forged surface of all parts can be used. Even if the machining is applied, the number of machining locations is a minimum so that the manufacturing cost is extremely low. Also, since the formation of the tooth form portion is carried out by the fine blanking process, the surface of the tooth becomes a shaving surface and the precision becomes extremely high. Thus, there are excellent practical advantages of this invention.

What is claimed is:

1. A method for machining a clutch gear for an automobile transmission, consisting essentially of the steps of:
   (a) providing a generally round annular bar of malleable material having an outwardly extending flange at one end thereof;
   (b) pressing the generally round annular bar is a first die having a cross sectional mold portion of a predetermined dimension and including a plurality of radial grooves of triangular cross section to simultaneously provide the bar with a predetermined cross section, radially elongate the flange and provide the flange with radial chamfer projections thereon;
   (c) fine blanking the chamfer projections on the flange of the bar with a second die including a tooth form mold having a predetermined dimension to form the chamfer projections into a corresponding clutch tooth form without forming a push wall extending radially outwardly from the clutch tooth form; and
   (d) pressing the resultant clutch tooth form in a third die having a tapered surface mold portion adjacent the clutch tooth form to provide an inverted tapered surface on the clutch tooth form which prevents accidental disengagement of the clutch tooth form in an automobile transmission.

* * * * *